United States Patent
Sato et al.

(10) Patent No.: US 6,589,906 B2
(45) Date of Patent: Jul. 8, 2003

(54) METHODS FOR PRODUCING OXIDES OR COMPOSITES THEREOF

(75) Inventors: Koji Sato, Tokyo (JP); Shigeaki Ohmi, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/042,217

(22) Filed: Jan. 11, 2002

(65) Prior Publication Data

US 2002/0147108 A1 Oct. 10, 2002

Related U.S. Application Data

(62) Division of application No. 09/215,123, filed on Dec. 18, 1998, now Pat. No. 6,355,308.

(30) Foreign Application Priority Data

Dec. 18, 1997 (JP) .............................. 9-349077
Dec. 18, 1997 (JP) .............................. 9-349094
Mar. 11, 1998 (JP) .............................. 10-59742
Mar. 11, 1998 (JP) .............................. 10-59745

(51) Int. Cl.$^7$ .................... B01J 23/00; C04B 33/00; B01D 9/00; C01F 7/34; C01B 13/14
(52) U.S. Cl. .................. 502/300; 501/151; 23/300; 23/301; 23/305 SR; 423/263; 423/592; 423/608
(58) Field of Search ............... 501/151; 502/300; 23/300, 301, 305 SR; 423/263, 608, 592

(56) References Cited

U.S. PATENT DOCUMENTS

| | | | | |
|---|---|---|---|---|
| 5,811,192 A | | 9/1998 | Takahama et al. | 428/432 |
| 5,830,242 A | * | 11/1998 | Yao | 23/300 |
| 5,869,187 A | | 2/1999 | Nakamura et al. | 427/428 |
| 6,066,359 A | * | 5/2000 | Yao et al. | 427/126.3 |

FOREIGN PATENT DOCUMENTS

| | | | |
|---|---|---|---|
| EP | 0761601 | | 3/1996 |
| EP | 0767141 | | 3/1996 |
| EP | 0816466 | | 3/1996 |
| EP | 0761601 | | 3/1997 |
| EP | 767141 | * | 4/1997 |
| EP | 0767141 | | 4/1997 |
| EP | 0861805 | | 9/1997 |
| JP | 4-132636 | | 5/1992 |
| JP | 9-59041 | | 3/1997 |

OTHER PUBLICATIONS

Aguado et al, "Degradation of formic acid over semiconducting membranes supported on glass. Effects of structure and electronic doping," Abstract. Jan. 1993.

European Search Report issued in Application No. EP 98 12 3962. Nov. 1999.

* cited by examiner

Primary Examiner—Mark L. Bell
Assistant Examiner—Patricia L. Hailey
(74) Attorney, Agent, or Firm—Burns, Doane, Swecker & Mathis, L.L.P.

(57) ABSTRACT

Disclosed are methods for producing films of a composite comprising a metal oxide in combination with one or more other oxides or metals as a third component, or a composite comprising a metal oxide doped with metal ions as a third component, methods for producing titanium oxide coating layers having transparency, low peeling property and weather resistance, which are comparable to or even more excellent than those of conventional ones, as well as surface hardness comparable to that of coating films produced by using sintering, on plastic substrates, and methods for producing titanium oxide which exhibits photocatalytic activity even with light of visible light range. These methods do not require a treatment at a high temperature. Also disclosed are anti-fogging materials excellent in anti-fogging property, which have transparency, peeling property and weather resistance, which are comparable to or even more excellent than those of conventional ones, as well as surface hardness comparable to that of coating films produced by using sintering, and have excellent photocatalytic function of titanium oxide and a reflectance lower than titanium oxide.

15 Claims, 2 Drawing Sheets

METHODS FOR PRODUCING OXIDES OR COMPOSITES THEREOF

This application is a divisional of application Ser. No. 09/215,123, filed on Dec. 18 1998, now U.S. Pat. No. 6,355,308.

BACKGROUND OF THE INVENTION

1. Field of the Invention

The present invention relates to methods for producing a composite comprising plural metal oxides, a composite comprising a metal oxide and microparticles of a material other than the metal oxide, and a composite of metal oxide doped with metal ions. In particular, the production methods of the present invention can be applied even to materials of which substrates are not heat-resistant since heating at a high temperature is not required. The composites and oxides doped with metal ions obtained by the methods of the present invention are useful as, depending the nature of the oxides, materials for photocatalysts, memory devices, batteries, sensors, photonics and the like.

The present invention further relates to a method for forming a titanium oxide coating layer on plastic articles. In particular, because the method of the present invention does not require heating at a high temperature, it enables formation of a titanium oxide coating layer on heat-labile plastic substrates, which had been difficult by conventional methods. The photocatalytic function of titanium oxide can be imparted to plastic articles by the methods of the present invention.

The present invention also relates to a method for producing titanium oxide doped with metal ions, which is useful as a photocatalyst having visible light absorbing properties, and a photocatalyst having visible light absorbing properties.

The present invention further relates to a titanium oxide based anti-fogging material, a coating film comprising the anti-fogging material, and a substrate having the coating film such as spectacle lenses. The anti-fogging material of the present invention has excellent anti-fogging properties, and is a anti-fogging material of a low surface reflectance. The present invention further relates to a production method of the aforementioned anti-fogging material.

2. Background Art

It has been known that titanium oxide has photocatalytic function, and its applications are being developed in various fields because antibacterial, antifouling, and anti-fogging properties can be imparted by forming titanium oxide layers on surfaces.

However, titanium oxide can utilize light with limited wavelength in ultraviolet range. In order to utilize light contained in sun light effectively, it is desirable to utilize not only light in ultraviolet range but also light in visible light range. In this respect, it has been known that titanium oxide originally exhibiting catalytic reactions only with UV absorption is converted to one utilizable light in visible light range by doping with chromium ions (see, for example, Kubokawa, Honda, and Saito, "Photocatalyst", (1998)). In particular, Anpo et al. have successfully formed a titanium oxide film of visible light absorbing type by doping titanium oxide with chromium ions without aggregation of the ions through injection of the chromium ions by ion-implantation technique. Anpo et al. have succeeded in decomposition of $NO_x$ with light at 450 nm, which is within the visible light range, by using titanium oxide injected with chromium ions through the ion-implantation technique (1996, Proc. In DOE Workshop on Solar Hydrogen Production (1996)). In general, doping of semiconductor materials with a certain metal causes an impurity level in the semiconductor materials, thereby a new absorption band is added to absorption bands of the materials. However, it has been considered that because electrons and positive holes formed by light excitation of band gap are recombined on the chromium ions and inactivated, the photocatalytic reaction would not proceed. To the contrary, Anpo et al. have made it possible to control physical properties of solid titanium oxide by injecting chromium ions thereinto through irradiation of metal ion beam accelerated to high energy.

As a typical example of the technique for ceramic thin film formation under a low temperature condition which is utilizable in the field of photocatalysts, the fog-resistant coating compositions can be mentioned (Japanese Patent Unexamined Publication No. Hei 9-59041/1997). These compositions comprises a mixture consisting of a blend of a silicon precursor, amorphous silica precursor and photocatalyst particles (specifically, a mixture of silica sol, trimethoxymethylsilane, and titania sol), and thin films are made by applying the mixture on a substrate, and sintering it at a low temperature, i.e., 150° C.

By the Kanagawa Industrial Technology Research Institute, gold-titania composite ultramicroparticles having a core/shell structure have been produced by surrounding gold particles as nuclei with titanium oxide by the vapor-in-gas technique. Applications of these composite ultramicroparticles as materials of catalysts, wet type solar batteries, and capacitors are studied because they exhibit sun light absorbing properties and thermal stability.

As described above, it has been attempted to add a third component to a metal oxide or make a composite of metal oxides in order to improve function of the metal oxide or to prolong the duration where the function is retained. However, the aforementioned ion-implantation method requires enormous facility and hence is impractical, and the vapor method requires vaporization of the starting metal oxide material at a high temperature and has problems as described hereinafter.

It has also been known to use platinum and ruthenium oxide as a promoter along with titanium oxide when titanium oxide is used as a photocatalyst. It is preferred that these promoters should be incorporated into the surface of titanium oxide as dense as possible from the viewpoint of improvement of the catalytic function.

However, such a process requiring sintering at a high temperature for making a composite with a third component to a catalyst may not yield a desired composite, because it may form an intermediate according to chemical thermodynamics depending on the nature of the material to be combined.

Therefore, the first object of the present invention is to provide a method for making a composite of a metal oxide with another oxide or metal as a third component, or doping a metal oxide with metal ions as a third component without treatment at a high temperature.

As described above, there has been developed a technique capable of forming a titanium oxide coating film with sintering at a lower temperature (100–150° C.) (Japanese Patent Unexamined Publication No. Hei 9-59041/1997). However, when the articles desired to be imparted with the photocatalytic function are poorly heat-resistant plastic materials or the like, the aforementioned method for forming coating films using a sintering step is not applicable.

Therefore, a titanium oxide coating material of low temperature drying type has been developed. This material is for adhering titanium oxide particles to substrates with an organic or inorganic binder. With this coating material, films are formed by spray coating, dip coating, photogravure printing and the like as ordinary paints. While the obtained films will have practical transparency, peeling property and weather resistance, they disadvantageously have a low hardness of 3–5H. It is obviously inferior than that of the films obtained by sintering at high temperature, which is 5–7H. From the viewpoint of practical use, such hardness as mentioned above may be a significant drawback in a certain field requiring scratch resistance.

Therefore, the second object of the present invention is to provide a method capable of forming titanium oxide coating layers having transparency, low peeling property and weather resistance, which are comparable to or even more excellent than those of conventional ones, and surface hardness comparable to that obtained by the sintering method without requiring any treatment at a high temperature.

The titanium oxide injected with chromium ions, which is produced by the aforementioned method of Anpo et al., may show photocatalytic activity even with light within visible light range. Although the ion-implantation technique is a common technique in the semiconductor industry, it requires vast equipment and high operation cost, and hence it is difficult to use it for ordinary production of photocatalysts.

Therefore, the third object of the present invention is to provide a method for producing titanium oxide showing photocatalytic activity even with light within visible light range with a markedly simpler and easier process compared with the ion-implantation method. The fourth object of the present invention is to provide a photocatalyst showing photocatalytic activity even with light within visible light range, which is produced by the method mentioned above.

In order to obviate the high reflectance of titanium oxide coating layers, a material showing low index of refraction such as silica is conventionally admixed in them. This is because titanium oxide has a high index of refraction of 2.60, and when it is provided on a substrate of a low index of refraction such as glass substrates, the titanium oxide layer serves as a reflecting layer to afford a high reflectance, which causes problems that, for example, when coated on spectacle lenses, they may reduce visual field and deteriorate the appearance of the lenses. As such thin films, there may be mentioned the aforementioned titanium oxide/silica mixed thin films disclosed in Japanese Patent Unexamined Publication No. Hei 9-59041/1997. According to this patent document, coating films are formed by sintering a coating film formed through the sol-gel process on a substrate at a low temperature (100–150° C.).

However, the photocatalytic function of titanium oxide is diluted and reduced by the addition of silica to titanium oxide. In addition, the aforementioned method requires sintering at 100–150° C. Though this may be considered a low temperature range, it is impossible to provide layers on a substrate of low heat resistance such as plastic substrates by the above method. For example, it is desirable to impart anti-fogging properties to a low heat resistance material such as mirrors, spectacle lenses and the like mad of plastic materials by forming on it films having high and durable anti-fogging properties.

Therefore, the fifth object of the present invention is to provide a anti-fogging material having transparency, peeling property and weather resistance, which are comparable to or even more excellent than those of conventional ones, surface hardness comparable to that of coating layers obtained by the sintering method, reflectance reduced by decreasing the difference of index of refraction from that of substrate, and durable anti-fogging properties, and not requiring a treatment at high temperature. The sixth object of the present invention is to provide a substrate having the aforementioned anti-fogging material as a coating layer, and a method for producing the aforementioned anti-fogging material which does not require a treatment at a high temperature.

SUMMARY OF THE INVENTION

An aspect of the present invention, which achieves the first object mentioned above, relates to a method for producing a composite composed of a mixture containing a metal oxide derived from a metal fluoro complex compound, which comprises adding a fluoride ion-capturing agent to an aqueous solution containing the metal fluoro complex compound to precipitate the composite (referred to as the method for producing composites of the present invention hereinafter).

In the method for producing composites of the present invention, the aqueous solution containing a metal fluoro complex compound may be an aqueous solution containing two or more kinds of metal fluoro complex compounds; and the composite may be precipitated in the presence of two or more kinds of seed crystals comprising metal oxides the same as those derived from the two or more kinds of metal fluoro complex compounds to form a composite comprising a mixture of two or more kinds of metal oxides (these metal oxides are both in a stable phase) derived from the metal fluoro complex compounds.

In the method for producing composites of the present invention, the aqueous solution containing a metal fluoro complex compound may contain microparticles, and the composite to be formed may be a mixture of a metal oxide derived from the metal fluoro complex compound and the microparticles; or the aqueous solution containing a metal fluoro complex compound may contain a water-soluble metal compound; and the composite to be formed may be a metal oxide which is derived from the metal fluoro complex compound and doped with metal ions derived from the water-soluble metal compound; or the aqueous solution containing a metal fluoro complex compound may contain a seed crystal comprising metal oxide which is the same as that formed from the metal fluoro complex compound.

In the method for producing composites of the present invention, the composite may be in the form of a thin film precipitated on a substrate immersed in the aqueous solution containing a metal fluoro complex compound.

Another aspect of the present invention, which achieves the second object mentioned above, relates to a method for forming a titanium oxide coating layer on a plastic substrate, which comprises adding a fluoride ion-capturing agent to an aqueous solution containing a fluorotitanium complex compound to precipitate a titanium oxide coating layer on a plastic substrate immersed in the aqueous solution (referred to as the method for precipitating titanium oxide coating layers of the present invention hereinafter).

In the method for precipitating titanium oxide coating layers of the present invention, the aqueous solution containing a fluorotitanium complex compound may contain titanium oxide particles. In the method for precipitating titanium oxide coating layers of the present invention, the plastic substrate may have a underlying layer on its surface on which the coating layer is formed. The underlying layer may be an oxide layer or fluoride layer, and the oxide layer may be a silicon oxide layer.

In the method for precipitating titanium oxide coating layers of the present invention, the aqueous solution containing a fluorotitanium complex compound may contain at least one kind of material selected from the group consisting of metal oxide colloidal particles, metal colloidal particles, organic material particles and water-soluble metal compound, and the titanium oxide coating layer may be a layer comprising a composite of titanium oxide derived from the fluorotitanium complex compound with the particles and/or metal ions derived from the compound.

Another aspect of the present invention, which achieves the aforementioned third object of the present invention, relates to a method for producing visible light absorbable titanium oxide, which comprises adding a fluoride ion-capturing agent to an aqueous solution containing a fluorotitanium complex compound and a metal compound to precipitate titanium oxide doped with metal ions derived from the metal compound (referred to as the method for producing visible light absorbable titanium oxide of the present invention hereinafter).

In the above method for producing visible light absorbable titanium oxide of the present invention, the metal ions may be at least one kind of ions selected from the group consisting of chromium ions, iron ions and vanadium ions. The aqueous solution may contain a seed crystal comprising titanium oxide. The method for producing visible light absorbable titanium oxide of the present invention may be a method comprising recovering particles of titanium oxide doped with metal ions, which particles have been precipitated in the aqueous solution.

In the above method for producing visible light absorbable titanium oxide of the present invention, which achieves the fourth object of the present invention, a thin film of titanium oxide doped with metal ions may be precipitated on a substrate immersed in the aqueous solution. In the method for producing visible light absorbable titanium oxide of the present invention, the precipitated titanium oxide doped with metal ions may be subjected to a heat treatment to obtain a uniform doping level.

The present invention also relates to a visible light absorbable photocatalyst composed of titanium oxide doped with metal ions, which is produced by the aforementioned method for producing visible light absorbable titanium oxide of the present invention (referred to as visible light absorbable photocatalyst of the present invention hereinafter).

In the visible light absorbable photocatalyst of the present invention, the titanium oxide doped with metal ions may be powder or a thin film on a substrate.

Another aspect of the present invention, which achieves the above fifth object of the present invention, relates to a anti-fogging material comprising (1) titanium oxide and a metal oxide having an index of refraction different from that of titanium oxide, or an oxide containing titanium and a metal (metal oxide of the metal has an index of refraction different from that of titanium oxide), (2) noble metal particles, and (3) transition metal (referred to as the anti-fogging material of the present invention hereinafter).

With the aforementioned anti-fogging material of the present invention, for example, a coating film composed of the anti-fogging material of the present invention, or a substrate having the coating film on its surface can be provided. This substrate may be composed of a plastic, and the coating film may be formed on an underlying layer provided on the plastic. The substrate may be a spectacle lens.

Another aspect of the present invention, which achieves the above sixth object of the present invention, relates to a method for producing the aforementioned anti-fogging material of the present invention comprising adding a fluoride ion-capturing agent to an aqueous solution containing at least a fluorotitanium complex compound, metal fluoro complex compound (metal oxide derived from this compound has an index of refraction different from that of titanium oxide), noble metal colloidal particles or noble metal compound, and transition metal compound to form a precipitate (referred to as the method for producing the anti-fogging material of the present invention).

Figure 1:
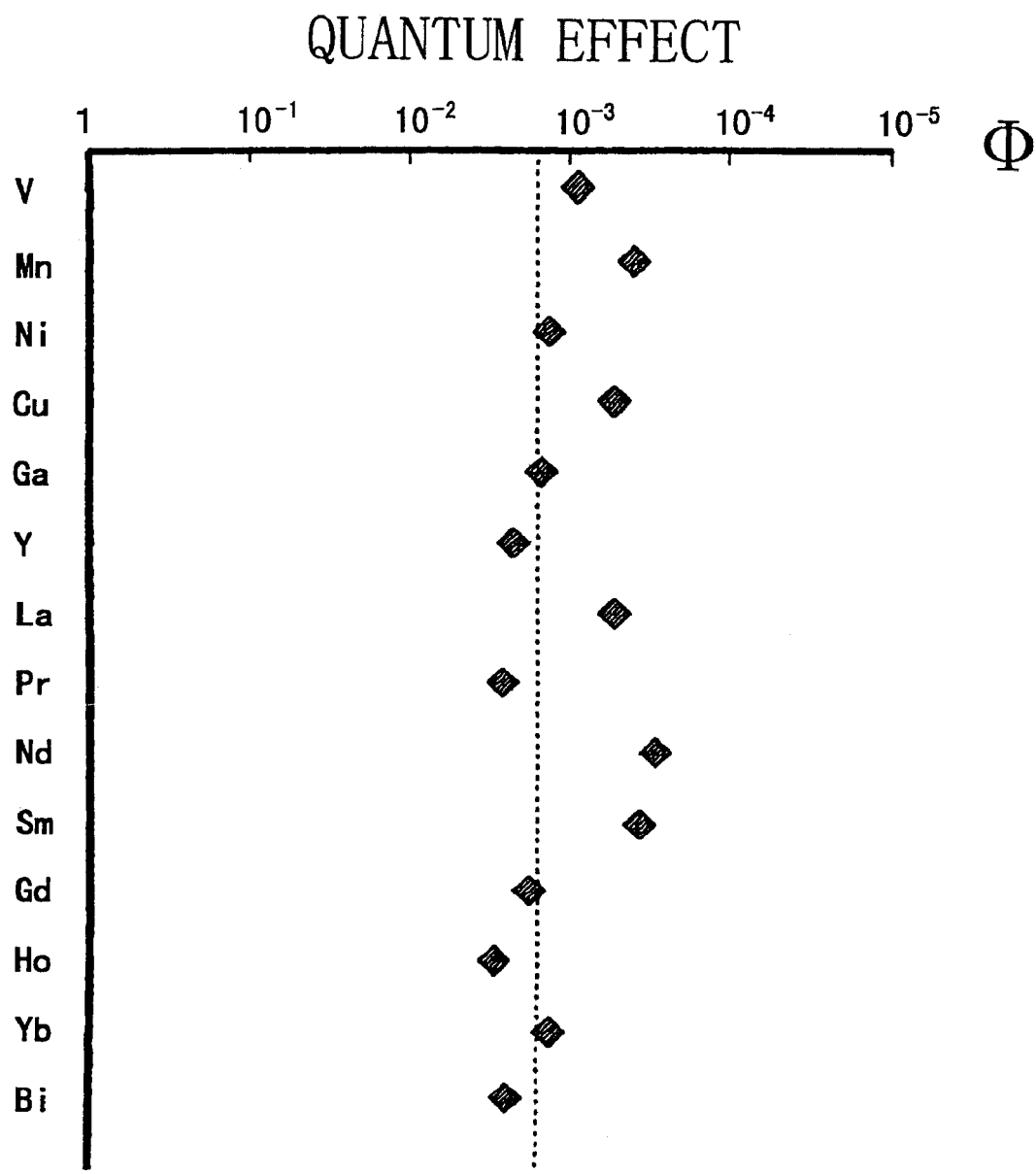
FIG. 1 shows quantum effects obtained from results of oil decomposition with metal doped $TiO_2$ composite films.

Preferred Embodiments for Carrying out the Invention (1) Method for Producing Composite of the Present Invention The method for producing composites of the present invention resembles the method disclosed in Japanese Patent Application No. (Hei) 9-149500/1997 in that it uses an aqueous solution containing a metal fluoro complex compound and a fluoride ion-capturing agent. However, they are different from each other, because the method of the present invention is a method for producing a composite, whereas the method of Japanese Patent Application No. (Hei) 9-149500/1997 is a method for producing a solid solution.

As the metal fluoro complex compound contained in the aqueous solution containing a metal fluoro complex compound, compounds represented by the following general formula (I) can be mentioned:

$$A_aM_bF_c \qquad \text{(I)}$$

In the formula, A is one or more kinds of atoms or the like selected from the group consisting of hydrogen atom, alkali metal atoms, ammonium group and coordinated water, M is metal, and a, b and c are each a number making the metal fluoro complex compound electrically neutral. To form this metal fluoro complex compound, a water-soluble acid or salt is used.

As A, there may be mentioned hydrogen atom; an alkali metal atom such as lithium, sodium, potassium, rubidium and cesium; an ammonium group; and coordinated water. As M (metal), there may be mentioned titanium, silicon, zirconium, niobium, germanium, aluminium, indium, tin, zinc, copper and the like. However, A and M are not limited to these metals. When b is 1, c is normally 6, and a is normally 2 or 3 though it may vary depending on the valence of M. Typically, the formula is described as $A_3MF_6$ or $A_2MF_6$. The compounds may also be a polynuclear chelate compound comprising several metal atoms (M).

The above aqueous solution containing a metal fluoro complex compound can be prepared by dissolving an intended metal oxide in hydrofluoric acid. Alternatively, the metal fluoro complex compound may be prepared by dissolving a corresponding metal hydroxide or oxyhydroxide in an aqueous solution containing an ammonium hydrogen difluoride or alkali metal hydrogen difluoride such as sodium hydrogen difluoride. The metal fluoro complex compound is used by being prepared as an aqueous solution generally having a concentration of $10^{-9}$ to 10 mol/L, preferably $10^{-6}$ to $10^{-1}$ mol/L in terms of the metal amount. The aqueous solution may be one containing excess hydrogen fluoride used for the preparation of the metal complex compound.

The fluoride ion-capturing agent used in the present invention may be any one capable of capturing fluoride ions in the aqueous solution containing a metal fluoro complex compound to precipitate a composite containing a metal oxide. The fluoride ion-capturing agent generally include those of homogeneous type, which are used by being dissolved in a liquid phase, and those of heterogeneous type, which are a solid material. Depending on the purpose, either of them may be used, or both of them may be used in combination.

The homogeneous type fluoride ion-capturing agent may alter the equilibrium of fluoride ions through reaction with hydrogen fluoride to form a stable fluoro complex compound and/or fluoride so that a composite containing metal oxide should be precipitated. Its examples are boric acid including orthoboric acid, metaboric acid, etc.; aluminium chloride, sodium hydroxide, aqueous ammonia, and the like.

While such a capturing agent is generally used in the form of an aqueous solution, it may also be added in the form of powder and dissolved in the system. Addition of the capturing agent may be carried out at one time or intermittently in several divided amounts, or may be carried out continuously at a controlled supplying rate, for example, a constant rate.

Examples of the heterogeneous type fluoride ion-capturing agent include metals such as aluminum, titanium, iron, nickel, magnesium, copper, and zinc; ceramics such as glass, and other inorganic substances such as silicon, calcium oxide, boron oxide, aluminum oxide, silicon dioxide, and magnesium oxide. When such a solid material is added or inserted into the aqueous solution, $F^-$ in the vicinity of the solid material is consumed to reduce its concentration, whereby chemical equilibrium in that area is shifted to precipitate a composite comprising a metal oxide. When such a solid material is used, depending on the addition or insertion method and their reaction conditions, the composite containing the metal oxide can be precipitated, for example, on the entire surface of a substrate immersed in the aqueous solution, or on a selected local portion, i.e., the vicinity of the solid material. Alternatively, by using the homogeneous type and heterogeneous type fluoride ion-capturing agents in combination, for example, a precipitated thin film on the surface of a substrate can partially be made thicker. The composite may also be precipitated in an aqueous solution. The composite precipitated in an aqueous solution may be collected by filtration or the like, and utilized for another process after washed and dried as required.

The amount of the homogeneous type fluoride ion-capturing agent may vary depending on the kind and shape of the precipitates, but it may generally be used in an amount of $10^{-4}$ to 1,000%, preferably $10^{-2}$ to 500% of the amount corresponding to the amount of fluoride ions in the solution in terms of equivalent.

As the substrate, a wide range of materials for carrying the composite containing a metal oxide can be used. Examples of the material for the substrate include, for example, glass, metals, ceramics, organic polymer materials (plastics) and the like. Further, composites of these materials and these materials having a thin film of $SiO_2$, $Al_2O_3$, $ZrO_2$, ITO, $CaF_2$ and the like on their surfaces may also be used as the substrate. The shape and structure of the substrate may be arbitrarily selected, and is not limited to a plate. Those in a complicated shape may also be used. For example, the substrate may be in a shape of bulk body, plate, porous body or the like.

The time when the substrate is immersed in the solution containing a metal fluoro complex compound may be before, simultaneously with or after addition or insertion of the fluoride-capturing agent. However, when a substrate which may be corroded by the system is used, it is necessary to pay attention to the composition of the solution, the reaction conditions and the time of immersion.

The reaction temperature can optionally be set in such a range that the system should be maintained as a solution, but it is preferably in the range of 10–80° C. The reaction time may also be optionally selected, and the reaction time may be prolonged, for example, as the desired amount of the precipitates increases.

As described above, a composite containing metal oxide can be formed on a surface of substrate or in an aqueous solution. The precipitate formed as above can be obtained as a precipitate of composite containing the metal oxide crystallized depending on the conditions even without a particular heat treatment such as sintering. However, a heating step may optionally be used depending on purposes.

The composite obtained by the method of the present invention is a composite containing an oxide of, for example, titanium, silicon, zirconium, niobium, germanium, aluminium, indium, tin, zinc, copper and the like. The composite of the present invention include a composite composed of a mixture of two or more kinds of metal oxides, composite containing microparticles in metal oxide, and composite composed of metal oxide doped with metal ions.

The method for producing composites of the present invention is mainly practiced as the following three embodiments.

The first embodiment is a method for forming a composite comprising a mixture of two or more kinds of metal oxides derived from the metal fluoro complex compound. In this embodiment, the "aqueous solution containing a metal fluoro complex compound" is an aqueous solution containing two or more kinds of metal fluoro complex compounds, and the composite is precipitated in the presence of two or more kinds of seed crystals comprising metal oxides derived from two or more kinds of the metal fluoro complex compounds in addition to the fluoride ion-capturing agent. By using seed crystals of the metal oxides to be precipitated, any of the precipitating metal oxides can be in a stable phase.

The seed crystals are preferably those having a small size, i.e., in the range of 0.001–10 μm, preferably 0.001–1 μm, and their addition amount can be decided taking into account the amount of the composite to be precipitated and the like. In this method of the present invention, the precipitate can be obtained as a stable phase by using seed crystals of the objective metal oxides. The precipitation rate and the uniformity of the film can also be controlled by selecting the particle diameter, addition amount and the like of the seed crystals. The seed crystals can be supplemented during the precipitation as required.

The second embodiment is a method for producing a composite composed of a mixture of a metal oxide derived from a metal fluoro complex compound and microparticles.

The composite can be formed by dispersing the microparticles in an aqueous solution containing a metal fluoro complex compound, and precipitating the composite from this aqueous solution. As the microparticles, metal colloidal particles, metal oxide colloidal particles, organic material particles and the like can be mentioned. Examples of the metal colloidal particles include those of Cu, Ag, Pt and the like. Examples of the metal oxide colloidal particles include those of $Fe_2O_3$, $Cu_2O$, CuO and the like. Examples of the organic material particles include, for example, those of polystyrene, polyethylene terephthalate, acrylic resin, polycarbonate and the like.

The particle diameter and the addition amount into the aqueous solution of the microparticles may be varied depending on the objective composite. However, the particles diameter may be, for example, in the range of $10^{-3}$–1 μm considering dispersibility in the aqueous solution and existing condition in the composite of the microparticles. The amount of the microparticles to be added to the aqueous solution may be, for example, in the range of $10^{-2}$–$10^2$ g per liter of the solution considering the concentration of the microparticles in the composite. Like the seed crystals, the microparticles may be supplemented during the reaction.

The third embodiment of the method of the present invention is a method for producing a composite composed of a metal oxide derived from a metal fluoro complex compound doped with metal ions. In this embodiment, the formed composite is a metal ion doped metal oxide. The metal ions to be doped into the metal oxide may be, for example, silver ions, copper ions, platinum ions, vanadium ions, chromium ions, manganese ions, iron ions, cobalt ions, nickel ions, gallium ions, yttrium ions, lanthanum ions, praseodymium ions, neodymium ions, samarium ions, gadolinium ions, holmium ions, ytterbium ions, bismuth ions and the like. However, any metal ions can be doped so long as they are derived from a compound soluble in the aqueous solution containing a metal fluoro complex compound.

Examples of such a water-soluble metal compound include, for example, $AgF.xH_2O$, $AgNO_3$, $Rh(NO_3)_3.2H_2O$, $Cu(NO_3)_2.3H_2O$, $Cr(NO_3)_3 \cdot xH_2O$, $CuF_2.2H_2O$, $CuCl_2.2H_2O$, $PtCl_4.5H_2O$, $VOSiO_4.2H_2O$, $VOCl_3$, $Cr_2(SO_4)_3.18H_2O$, $CrCl_3.xH_2O$, $MnCl_2.4H_2O$, $MnCl_2$, $Mn(NO_3)_2.6H_2O$, $MnSO_4.6H_2O$, $MnF_2$, $MnF_3.3H_2O$, $FeCl_2.4H_2O$, $FeCl_2$, $FeCl_3.6H_2O$, $FeCl_3$, $Fe(NO_3)_3.9H_2O$, $FeSO_4.7H_2O$, $FeSO_4$, $(NH_4)Fe(SO_4)_3.xH_2O$, $Co(NO_3)_2.6H_2O$, $CoSO_4.7H_2O$, $NiCl_2.6H_2O$, $Ni(NO_3)_2.6H_2O$, $NiSO_4$, $Cu(NO_3)_2.3H_2O$, $CuSo_4.5H_2O$, $CuSO_4$, $CuCl_2.2H_2O$, $CuF_2.2H_2O$, CuCl, $Sc(SO_4)_3.xH_2O$, $V_2O_5$, $Ni(NO_3)_2.xH_2O$, $Ga_2O_3$, $Y(NO_3)_3.xH_2O$, $La(NO_3)_3.xH_2O$, $Pr(NO_3)_3.xH_2O$, $Nd(NO_3)_3.xH_2O$, $Sm(NO_3)_3.xH_2O$, $Gd(NO_3)_3.xH_2O$, $Yb(NO_3)_3.xH_2O$, $Bi(NO_3)_3.xH_2O$ and the like.

The concentration of the water-soluble metal compound may be, for example, in the range of $10^{-4}$–10 mol per liter of the solution considering its solubility and doping amount in the composite. The water-soluble metal compound may be supplemented during the reaction.

Also in the above second and third embodiments, the aqueous solution containing a metal fluoro complex compound may contain seed crystals comprising a metal oxide corresponding to the one to be formed from the metal fluoro complex compound. By using such seed crystals, the metal oxide can be precipitated as a stabile phase.

It is also possible to form a composite containing two or more kinds of substances at one time by a method consisting of any combination of two or more of the aforementioned three embodiments.

(2) Method for Precipitating Titanium Oxide Coating Layers of the Present Invention The method for precipitating titanium oxide coating layers of the present invention is a method for forming a titanium oxide coating layer on a plastic substrate, which comprises adding a fluoride ion-capturing agent to an aqueous solution containing a fluorotitanium complex compound to precipitate the titanium oxide coating layer on the plastic substrate immersed in the aqueous solution. In the method for precipitating titanium oxide coating layers of the present invention, an aqueous solution containing a fluorotitanium complex compound is prepared. The aqueous solution containing a fluorotitanium complex compound can be prepared by dissolving titanium oxide in hydrofluoric acid. Alternatively, the fluorotitanium complex compound can be prepared by dissolving a corresponding titanium hydroxide or oxyhydroxide in an aqueous solution containing an ammonium hydrogen difluoride or alkali metal hydrogen difluoride such as sodium hydrogen difluoride. The fluorotitanium complex compound is used by being prepared as an aqueous solution generally having a concentration of $10^{-9}$ to 10 mol/L, preferably $10^{-6}$ to $10^{-1}$ mol/L in terms of the metal amount. The aqueous solution may be one containing excess hydrogen fluoride used for the preparation of the complex compound.

The aqueous solution containing a fluorotitanium complex compound may contain titanium oxide particles as seed crystals. The seed crystals are preferably those having a small size, i.e., in the range of 0.001–10 μm, preferably 0.001–1 μm, and their addition amount can be suitably decided taking into account the amount of the titanium oxide to be precipitated and the like. In the method of the present invention, the precipitate can be obtained as a stable phase by using seed crystals of the titanium oxide particle seed crystals. The precipitation rate and the uniformity of the film can also be controlled by selecting the particle diameter, addition amount and the like of the seed crystals. The seed crystals can be supplemented during the precipitation as required.

To the above aqueous solution containing a fluorotitanium complex compound, at least one kind of material can be added which selected from the group consisting of colloidal particles of metal oxide other than titanium oxide, metal colloidal particles, organic material particles and water-soluble metal compound. This makes it possible to form the titanium oxide coating layer as a layer comprising a composite of titanium oxide derived from the fluorotitanium complex compound with the particles and/or metal ions derived from the metal compound. The kind of the aforementioned metal colloidal particles, diameter and addition amount to the aqueous solution of the particles, kind of the metal ions contained in the water-soluble metal compound, kind of the water-soluble metal compound, the concentration of the water-soluble metal compound and the like may be similar to those explained for the method for producing composites of the present invention hereinbefore.

The fluoride ion-capturing agent used in the method for precipitating titanium oxide coating layers of the present invention may be any one capable of capturing fluoride ions from the aqueous solution containing a fluorotitanium complex compound to precipitate a titanium oxide coating layer, and either or both of the homogeneous and heterogeneous fluoride ion-capturing agents explained for the method for producing composites of the present invention can be used with similar conditions to those explained for the method for producing composites of the present invention.

The substrate used in the method for precipitating titanium oxide coating layers of the present invention is made of plastics (organic polymer materials). Those plastics may be a thermoplastic resin, or thermosetting resin. Because the production method of the present invention does not require heating, even a plastic substrate of low heat resistance may also advantageously be used. Examples of the plastic materials include, but not limited to, methyl methacrylate homopolymer, copolymers of methyl methacrylate and one or more kinds of other monomers, diethylene glycol bis(allyl carbonate) homopolymer, copolymers of diethylene glycol bis(allyl carbonate) and one or more kinds of other monomers, polycarbonate, polystyrene, polyvinyl chloride, unsaturated polyester, polyethylene terephthalate, polyurethane, polythiourethane and the like. The shape or structure of the plastic substrate may optionally be selected, and is not limited to a plate shape, and those in a complicated shape may also be used. For example, it can be a bulk body, plate, porous body or the like.

Further, the plastic substrate preferably has an underlying layer on its surface on which the titanium oxide coating layer is to be formed in order to improve adhesion between the plastic substrate and the titanium oxide coating layer and to prevent degradation of the plastic substrate due to photocatalytic action of the titanium oxide coating layer.

The underlying layer may be, for example, a layer of oxide such as $SiO_2$, $Al_2O_3$, $ZrO_2$, and ITO, fluoride such as $CaF_2$, or metal such as stainless steel, copper, brass, and titanium. The underlying layer may also be a layer composed of laminated two or more of those layers mentioned above. As the oxide layer, silicon oxide ($SiO_2$) and zirconium oxide ($ZrO_2$) layers are particularly preferred.

The thickness of the underlying layer may be 0.1–1 $\mu$m, and the layer having such a thickness can sufficiently exert the effect of the underlying layer. The underlying layer may be prepared by any one of dry processes such as vacuum deposition and sputtering techniques, and wet processes such as aqueous solution technique and sol-gel process.

The time when the substrate is immersed in the solution containing a fluorotitanium complex compound may be before, simultaneously with or after addition of the fluoride-capturing agent. However, when a substrate which may be corroded by the system is used, it is necessary to pay attention to the composition of the solution, the reaction conditions and the time of immersion.

The reaction temperature can optionally be set in such a range that the system should be maintained as a solution, but it is preferably in the range of 10–80° C. The reaction time may also be optionally selected, and the reaction time may be prolonged, for example, as the desired amount of the precipitate increases.

As described above, a titanium oxide coating layer can be formed on a surface of substrate. The titanium oxide coating layer formed as above can be obtained as titanium oxide crystallized depending on the conditions even without a particular heat treatment such as sintering. However, a heating step may optionally used as required.

(3) Method for Producing Visible Light Absorbable Titanium Oxide of the Present Invention The method for producing visible light absorbable titanium oxide of the present invention is characterized in that a fluoride ion-capturing agent is added to an aqueous solution containing a fluorotitanium complex compound and a metal compound to precipitate titanium oxide doped with metal ions derived from the metal compound.

The visible light absorbable titanium oxide of the present invention is one consisting of titanium oxide doped with metal ions. By doping titanium oxide with metal ions, the titanium oxide becomes to have visible light absorbing property and to be able to exhibit photocatalytic activity not only with ultraviolet light but also with visible light. Examples of the metal ions suitable for the doping in order to impart the visible light absorbing property include, for example, one kind of metal ions selected from the group consisting of chromium ions, iron ions and vanadium ions. However, the metal ions are not limited to these ions, and any metal ions capable of imparting the visible light absorbing property can be used. Examples of such metal ions include ions of metals such as aluminium, bismuth, erbium, gallium, gadolinium, holmium, indium, lanthanum, lutetium, manganese, niobium, neodymium, praseodymium, platinum, rhodium, scandium, samarium, tin, tantalum, terbium, thulium, tungsten, yttrium, ytterbium, zirconium and the like. The doping amount of the metal ions may optionally be selected considering the kind of the metal ions and degrees of visible light absorbing property and photocatalytic activity required for the titanium oxide.

In the method for producing visible light absorbable titanium oxide of the present invention, an aqueous solution containing a fluorotitanium complex compound is prepared. The aqueous solution containing a fluorotitanium complex compound can be prepared by dissolving titanium oxide in hydrofluoric acid. Alternatively, the fluorotitanium complex compound may be prepared by dissolving titanium hydroxide or oxyhydroxide in an aqueous solution containing an ammonium hydrogen difluoride or alkali metal hydrogen difluoride such as sodium hydrogen difluoride. An aqueous solution containing a fluorotitanium complex compound and a metal compound can be prepared by mixing the above aqueous solution containing a fluorotitanium complex compound and an aqueous solution containing a metal compound.

While the concentration of the fluorotitanium complex compound may optionally be selected, the fluorotitanium complex compound is preferably used by being prepared as an aqueous solution generally having a concentration of $10^{-9}$ to $9\times10^{-2}$ mol/L, preferably $10^{-6}$ to $6\times10^{-2}$ mol/L in terms of the metal amount in order to obtain good transparency and homogeneity of the precipitate.

Examples of the metal compound used for doping titanium oxide with metal ions include, for example, $Cr(NO_3)_3 \cdot xH_2O$, $VOSiO_4 \cdot 2H_2O$, $VOCl_3$, $Cr_2(SO_4)_3 \cdot 18H_2O$, $CrCl_3 \cdot xH_2O$, $FeCl_2 \cdot 4H_2O$, $FeCl_2$, $FeCl_3 \cdot 6H_2O$, $FeC_{;3}$, $Fe(NO_3)_2 \cdot 9H_2O$, $FeSO_4 \cdot 7H_2O$, $FeSO_4$, $(NH_4)Fe(SO_4)_3 \cdot xH_2O$, $Co(NO_3)_2 \cdot 6H_2O$ and the like.

The concentration of the metal compound may be, for example, in the range of $10^{-4}$–10 mol per liter of the solution considering its solubility and doping amount in titanium oxide. The metal compound may be supplemented during the reaction.

The fluoride ion-capturing agent used in the method producing visible light absorbable titanium oxide of the present invention may be any one capable of capturing fluoride ions from the aqueous solution containing a fluorotitanium complex compound to precipitate a titanium oxide coating layer, and either or both of the homogeneous and heterogeneous fluoride ion-capturing agents explained for the method for producing composites of the present invention can be used with similar conditions to those explained for the method for producing composites of the present invention.

In the method for producing visible light absorbable titanium oxide of the present invention, the aqueous solution containing a fluorotitanium complex compound and a metal compound may contain titanium oxide particles as seed crystals. The seed crystals are preferably those having a small size, i.e., in the range of 0.001–10 μm, preferably 0.001–1 μm, and their amount can be decided taking into account the amount of titanium oxide to be precipitated and the like. The precipitation rate and the uniformity of the film can also be controlled by selecting the particle diameter, addition amount and the like of the seed crystals. The seed crystals can be supplemented during the precipitation as required.

In the method for producing visible light absorbable titanium oxide of the present invention, titanium oxide particles (powder) doped with metal ions can be obtained by recovering such particles precipitated in the aqueous solution. The recovery of the titanium oxide particles from the aqueous solution can be performed in a conventional manner.

Alternatively, in the method for producing visible light absorbable titanium oxide of the present invention, a thin film of titanium oxide doped with metal ions can be precipitated on a substrate by immersing the substrate in the aqueous solution. The substrate may be made of, for example, glass or plastics (organic polymer materials). Those plastics may be a thermoplastic resin, or thermosetting resin. Because the production method of the present invention does not require heating, even a plastic substrate of low heat resistance may also advantageously be used. The shape or structure of the plastic substrate may optionally be selected, and is not limited to a plate shape, and those in a complicated shape may also be used. For example, it can be a bulk body, plate, porous body or the like.

Further, the plastic substrate preferably has an underlying layer on the surface on which the photocatalytic thin film is to be formed in order to improve adhesion between the plastic substrate and the thin film and to prevent degradation of the substrate due to photocatalytic action of the thin film.

The underlying layer may be, for example, a layer of oxide such as $SiO_2$, $Al_2O_3$, $ZrO_2$, and ITO, or fluoride such as $CaF_2$. The thickness of the underlying layer may be 0.1–1 μm, and the layer having such a thickness can sufficiently exert the effect of the underlying layer. The underlying layer may be prepared by any one of dry processes such as vacuum deposition and sputtering techniques, and wet processes such as aqueous solution technique and sol-gel process.

The time when the substrate is immersed in the aqueous solution containing a fluorotitanium complex compound may be before, simultaneously with or after addition of the fluoride-capturing agent. However, when a substrate which may be corroded by the system is used, it is necessary to pay attention to the composition of the solution, the reaction conditions and the time of immersion.

The precipitation reaction temperature can optionally be set in such a range that the system should be maintained as a solution, but it is preferably in the range of 10–80° C. The reaction time may also be optionally selected, and the reaction time may be prolonged, for example, as the amount of the objective precipitates increases.

The powder and the thin film of titanium oxide doped with metal ions obtained as described above are preferably subjected to a heat treatment to obtain a uniform doping level with the metal ions. The heat treatment for obtaining a uniform doping level may be performed, for example, at a temperature of 400–600° C. for 5–120 minutes. The conditions of the heat treatment may be suitably selected considering the kind of the doping metal ions and the doping level required. In case of the thin film of titanium oxide doped with metal ions provided on a substrate, the kind of the substrate material is also taken into account for selecting the conditions of the heat treatment.

(4) Anti-fogging Material of the Present Invention

The anti-fogging material of the present invention is characterized in that it comprising (1) titanium oxide and a metal oxide having an index of refraction different from that of titanium oxide, or an oxide containing titanium and a metal (metal oxide of the metal has an index of refraction different from that of titanium oxide), (2) noble metal particles (these noble metal particles should be in contact with the titanium oxide, or the oxide containing titanium and a metal, and (3) transition metal (this transition metal is doped into the titanium oxide, or the oxide containing titanium and a metal).

Examples of the "metal oxide having an index of refraction different from that of titanium oxide" include, for example, silicon oxide, zirconium oxide, yttrium oxide, aluminium oxide and the like. Examples of the metal constituting the "oxide containing titanium and a metal" include, for example, the metals contained in the metal oxides exemplified above for the metal oxide having an index of refraction different from that of titanium oxide. Specific examples of the "oxide containing titanium and a metal" include, for example, Ti—Si oxide, Ti—Zr oxide, Ti—Y oxide, Ti—Al oxide and the like.

For example, the index of refraction of silicon oxide is 1.48, and substantially lower than the index of refraction of titanium oxide, i.e., 2.60. Therefore, by mixing silicon oxide, the index of refraction of the anti-fogging material can be lowered and made closer to that of glass or plastics (1.4–1.7), which constitute substrates of spectacle lenses. The composition of titanium oxide and the metal oxide having an index of refraction different from that of titanium oxide may be suitably decided considering index of refraction and photocatalytic activity required for the anti-fogging material or a coating film comprising the anti-fogging material. However, when the anti-fogging material is a coating film, the content of the metal oxide having an index of refraction different from that of titanium oxide is suitably selected so that the difference of index of refraction between the coating film and the substrate should be 1 or less, preferably 0.5 or less, more preferably 0.1 or less, in order to obtain a reduced reflectance.

The anti-fogging material of the present invention further contains noble metal particles. These noble metal particles are contained in such a manner that they should be in contact with titanium oxide or the "oxide containing titanium and a metal". By making titanium oxide or the "oxide containing titanium and a metal" carry the noble metal, the photocatalytic performance of titanium oxide or the "oxide containing titanium and a metal" can be improved. Examples of the noble metal include, but not limited to, Ag, Cu, Au, Pt, Pd, Rh, Ir and the like. The content and particle diameter of the noble metal particles can be suitably selected by considering photocatalytic activity required for the anti-fogging material.

The anti-fogging material of the present invention further contains transition metal, which is doped into titanium oxide or the "oxide containing titanium and a metal". By doping titanium oxide or the "oxide containing titanium and a metal" with the transition metal, durability of photocatalytic activity of titanium oxide or the "oxide containing titanium and a metal" can be improved. Examples of the transition metal ions include, but not limited to, those of Nd, V, Cr, Mn, Fe, Co, Ni, Cu, Sc and the like. The doping amount of the transition metal ions may be suitably selected by considering the kind of the transition metal ions and the photocatalytic activity required for the titanium oxide coating film.

The anti-fogging material of the present invention can be prepared by, for example, adding a fluoride ion-capturing agent to an aqueous solution containing a fluorotitanium complex compound, metal fluoro complex compound, metal colloidal particles or noble metal compound, and transition metal compound to form a precipitate. When the anti-fogging material is formed as a coating film on a substrate such as spectacle lenses, the material can be prepared by immersing the substrate such as spectacle lenses in the above solution (solution for treatment).

In the method for producing the anti-fogging material of the present invention, an aqueous solution containing a fluorotitanium complex compound and a metal fluoro complex compound is prepared. The aqueous solution containing a fluorotitanium complex compound can be prepared by dissolving titanium oxide in hydrofluoric acid. Alternatively, the fluorotitanium complex compound may be prepared by dissolving titanium hydroxide or oxyhydroxide in an aqueous solution containing an ammonium hydrogen difluoride or alkali metal hydrogen difluoride such as sodium hydrogen difluoride. Similarly, the aqueous solution containing a metal fluoro complex compound can be prepared, when the aqueous solution containing a metal fluoro complex compound is an aqueous solution containing fluorosilicon complex compound for example, by dissolving silica in hydrofluoric acid. Alternatively, the fluorosilicon complex compound may be prepared by dissolving hydroxide or oxyhydroxide of silica in an aqueous solution containing an ammonium hydrogen difluoride or alkali metal hydrogen difluoride such as sodium hydrogen difluoride. The aqueous solution containing a fluorotitanium complex compound and a metal fluoro complex compound can be prepared by mixing these solutions.

While the concentrations of the fluorotitanium complex compound and the metal fluoro complex compound in the aqueous solution may optionally be selected considering their ratio in a film to be formed, each of them is preferably used by being prepared as an aqueous solution generally having a concentration of $10^{-9}$ to 10 mol/L, preferably $10^{-6}$ to $10^{-1}$ mol/L in terms of the metal amount. The aqueous solution may be one containing excess hydrogen fluoride used for the preparation of the complex compounds.

The aqueous solution containing a fluorotitanium complex compound and a metal fluoro complex compound may contain metal oxide particles such as titanium oxide particles and silica particles as seed crystals. The seed crystals are preferably those having a small size, i.e., in the range of 0.001–10 $\mu$m, preferably 0.001–1 $\mu$m, and their addition amount can be decided by taking into account the amount of the metal oxide to be precipitated such as titanium oxide and silica and the like. In this method of the present invention, the metal oxide such as titanium oxide and silica can be obtained as a stable phase by using seed crystals of the metal oxide particles such as titanium oxide particles and/or silica particles. The precipitation rate and the uniformity of the film can also be controlled by selecting the particle diameter, addition amount and the like of the seed crystals. The seed crystals can be supplemented during the precipitation as required.

Further, the above aqueous solution containing a fluorotitanium complex compound and a metal fluoro complex compound should contain noble metal colloidal particles and/or noble metal compound as a noble metal particles source. Examples of the noble metal colloidal particles include, for example, those of Ag, Cu, Au, Pt, Pd, Rh, Ir and the like. The particles diameter and amount to be added to the aqueous solution of the colloidal particles can be suitably varied depending on the objective coating film. However, the particle diameter can be, for example, in the range of $10^{-3-1}$ $\mu$m when considering dispersibility in the aqueous solution and existing condition in the composite film of the colloidal particles. The amount of the colloidal particles to be added to the aqueous solution may be, for example, in the range of $10^{-2}$–$10^2$ g per liter of the solution considering the concentration of the microparticles in the film. Like the seed crystals, the colloidal particles may be supplemented during the reaction.

Examples of the metal ion contained in the noble metal compound include, for example, those of Ag, Cu, Au, Pt, Pd, Rh, Ir and the like. Examples of compounds containing these ions include, for example, $AgF.xH_2O$, $AgNO_3$, $Rh(NO_3)_3.2H_2O$, $Cu(NO_3)_2.3H_2O$, $CuF_2.2H_2O$, $CuCl_2.2H_2O$, $PtCl_4.5H_2O$, $CU(NO_3)_2.3H_2O$, $CuSO_4.5H_2O$, $CuSO_4$, $CuCl_2.2H_2O$, $CuF_2.2H_2O$, $CuCl$ and the like. The concentration of the noble metal compound may be, for example, in the range of $10^{-4}$–10 mol per liter of the solution considering its solubility and doping amount into titanium oxide. The noble metal compound may be supplemented during the reaction.

The aforementioned aqueous solution should further contain a compound of transition metal to be doped. Examples of the transition metal ions include, for example, those of Nd V, Cr, Mn, Fe, Co, Ni, Cu, Sc and the like. Examples of the transition metal compound include, for example, $Cr(NO_3)_3.xH_2O$, $VOSiO_4.2H_2O$, $VOCl_3$, $Cr_2(SO_4)_3.18H_2O$, $CrCl_3.xH_2O$, $MnCl_2.4H_2O$, $MnCl_2$, $Mn(NO_3)_2.6H_2O$, $MnSO_4.6H_2O$, $MnF_2$, $MnF_{2,}$ $_{MnF3}.3H_2O$, $FeCl_2.4H_2O$, $FeCl_2$, $FeCl_3.6H_2O$, $FeCl_3$, $Fe(NO_3)_2.9H_2O$, $FeSO_4.7H_2O$, $FeSO_4$, $(NH_4)Fe(SO_4)_3.xH_2O$, $Co(NO_3)_2.6H_2O$, $CoSO_4.7H_2O$, $NiCl_2.6H_2O$, $Ni(NO_3)_2.6H_2O$, $NiSO_4$, $Sc(SO_4)_3.xH_2O$ and the like.

The concentration of the transition metal compound may be, for example, in the range of $10^{-4}$–10 mol per liter of the solution considering its solubility and doping amount into titanium oxide. The transition metal compound may be supplemented during the reaction.

The fluoride ion-capturing agent used in the method for producing anti-fogging material of the present invention may be any one capable of capturing fluoride ions from the aqueous solution containing a fluorotitanium complex compound to precipitate a titanium oxide coating layer, and either or both of the homogeneous and heterogeneous fluoride ion-capturing agents explained for the method for producing composites of the present invention can be used with similar conditions to those explained for the method for producing composites of the present invention.

When the anti-fogging material is formed as a coating film on a substrate, the time when the substrate is immersed in the solution containing a fluorotitanium complex compound may be before, simultaneously with or after addition of the fluoride-capturing agent. However, when a substrate which may be corroded by the system is used, it is necessary to pay attention to the composition of the solution, the reaction conditions and the time of immersion.

The reaction temperature can optionally be set in such a range that the system should be maintained as a solution, but it is preferably in the range of 10–80° C. The reaction time may also be optionally selected, and the reaction time may be prolonged as the amount of the objective precipitates increases.

As described above, a coating film comprising the anti-fogging material of the present invention can be formed on a surface of substrate. The anti-fogging material of the present invention and a coating film comprising the anti-fogging material formed as above can be obtained as titanium oxide crystallized depending on the conditions even without a particular heat treatment such as sintering. However, a heating step may optionally be used as required.

The coating film of the present invention comprises the anti-fogging material of the present invention. While the thickness of this coating film is not particularly limited, it is preferably, for example, 0.1 µm or less in order to reduce the reflectance.

The substrate of the present invention is a substrate provided on its surface with the above coating film of the present invention. The substrate may be made of grass or plastics (organic polymer materials). The plastics may be a thermoplastic resin, or thermosetting resin. Because the production method of the present invention does not require heating, even a plastic substrate of low heat resistance may also advantageously be used. Examples of the plastic materials include, but not limited to, methyl methacrylate homopolymer, copolymers of methyl methacrylate and one or more kinds of other monomers, diethylene glycol bis(allyl carbonate) homopolymer, copolymers of diethylene glycol bis(allyl carbonate) and one or more kinds of other monomers, polycarbonate, polyurethane, polythiourethane and the like.

According to the present invention, the substrate may be a spectacle lens.

Further, the substrate preferably has an underlying layer on the surface on which the titanium oxide coating layer is to be formed in order to improve adhesion between the plastic substrate and the coating film of the present invention and to prevent degradation of the plastic substrate due to photocatalytic action of the coating film of the present invention.

The underlying layer may be, for example, a layer of oxide such as $SiO_2$, $Al_2O_3$, $ZrO_2$, and ITO, fluoride such as $CaF_2$, or metal such as stainless steel, copper, brass, and titanium. The underlying layer may also be a layer composed of laminated two or more of those layers mentioned above.

The thickness of the underlying layer may be 0.1–1 µm, and the layer having such a thickness can sufficiently exert the effect of the underlying layer. The underlying layer may be prepared by any one of dry processes such as vacuum deposition and sputtering techniques, and wet processes such as aqueous solution technique and sol-gel process.

The above underlying layer may be a single film or composite film comprising an oxide or fluoride layer known as an anti-reflection film of spectacle lenses.

EXAMPLES

The present invention will be further explained more in detail with reference to the following examples.

Example 1

As a metal fluoro complex compound, 2.8 g of ammonium hexafluorotitanate, $(NH_4)_2TiF_6$, was dissolved in 400 ml of pure water, and stirred. Then, 2 ml of $TiO_2$ anatase microparticles preliminarily suspended in pure water was added to the aqueous solution so that the aqueous solution should not be severely clouded, and the solution was homogenized by further stirring. Separately, $Fe_2O_3$ powder was added to pure water and suspended in it in the same manner as the anatase particles. 30 ml of supernatant of the suspension was taken from the suspension and added to the above aqueous solution.

The solution prepared as described above was transferred to a 500 ml-volume cylindrical container, and the container was immersed in a water bath maintained at 40° C. After the temperature of the solution was confirmed to have become 40° C., 10 g of boron oxide was quickly added to the solution, and stirred. Then, a glass substrate of 50×70×1 mm was immersed in the solution. The substrate was left under the conditions maintained as above for 3 to 4 hours.

At the end of the treatment, the substrate was removed from the container, roughly washed, and further washed by an ultrasonic cleaner. Then, the substrate was dried at 40° C. to form a $Fe_2O_3/TiO_2$ composite film on the substrate.

The substrate was irradiated by an ultraviolet lamp (black light, 10 W), and examined for whether it was fogged when blown with breath, and how long the anti-fogging property could be maintained. As a result, it was found that the composite film shortened the time of irradiation required for making the substrate not show fogging to one tenth or less of that required for a film composed solely of $TiO_2$, i.e., it requires about several tens minutes to 1 hour for a surface without any particular taint. On the other hand, it maintained the anti-fogging property for 10 hours after the irradiation, which was substantially prolonged compared with 2 or 3 hours obtained with the conventional film. From these observed functional alterations, it was confirmed that a $Fe_2O_3/TiO_2$ composite film had been formed.

Example 2

As a metal fluoro complex compound, 2.8 g of ammonium hexafluorotitanate, $(NH_4)_2TiF_6$, was dissolved in 400 ml of pure water, and stirred. Then, 2 ml of $TiO_2$ anatase microparticles preliminarily suspended in pure water was added to the aqueous solution so that the aqueous solution should not be severely clouded, and the solution was homogenized by further stirring. Subsequently, 0.21 g of neodymium nitrate $[Nd(NO_3)_3.xH_2O]$ was added to the solution, and dissolved in it.

The solution prepared as described above was transferred to a 500 ml-volume cylindrical container, and the container was immersed in a water bath maintained at 40° C. After the temperature of the solution was confirmed to have become 40° C., 10 g of boron oxide was quickly added to the solution and stirred. Then, a glass substrate of 50×70×1 mm was immersed in the solution. The substrate was left under the conditions maintained as above for 3 to 4 hours.

At the end of the treatment, the substrate was removed from the container, roughly washed, and further washed by an ultrasonic cleaner. Then, the substrate was dried at 40° C. to form a $Nd^{3+}$-doped $TiO_2$ composite film on the substrate.

The substrate was irradiated by an ultraviolet lamp (black light, 10 W), and examined for whether it was fogged when blown with breath, and how long the anti-fogging property could be maintained. As a result, it was found that the composite film shortened the time of irradiation required for making the substrate not show fogging to one tenth or less of that observed for a film composed solely of $TiO_2$, i.e., it requires about several tens minutes to 1 hour for a surface without any particular taint. On the other hand, it maintained the anti-fogging property for 10 hours after the irradiation, which was substantially prolonged compared with 2 or 3 hours obtained with the conventional film. From these observed functional alterations, it was confirmed that a $Nd^{3+}$-doped $TiO_2$ composite film had been formed.

Example 3

As a metal fluoro complex compound, 2.8 g of ammonium hexafluorotitanate, $(NH_4)_2TiF_6$, and 1.5 g of ammonium hexafluorosilicate, $(NH_4)_2SiF_6$, were dissolved in 400 ml of pure water, and stirred. Then, 2 ml of $TiO_2$ anatase microparticles and $SiO_2$ microparticles each preliminarily suspended in pure water were added to the aqueous solution so that the aqueous solution should not be severely clouded, and the solution was homogenized by further stirring.

The solution prepared as described above was transferred to a 500 ml-volume cylindrical container, and the container was immersed in a water bath maintained at 40° C. After the temperature of the solution was confirmed to have become 40° C., 10 g of boron oxide was quickly added to the solution and stirred. Then, a glass substrate of 50×70×1 mm was immersed in the solution. The substrate was left under the conditions maintained as above for 3 to 4 hours.

At the end of the treatment, the substrate was removed from the container, roughly washed, and further washed by an ultrasonic cleaner. Then, the substrate was dried at 40° C. to form a $TiO_2/SiO_2$ composite film on the substrate.

The substrate showed an reflectance for visible light region lower by 12–14% than that shown by a film composed solely of $TiO_2$. From this observed functional alteration, it was confirmed that a $TiO_2/SiO_2$ composite film had been formed.

Examples 4–17

The metal-doped $TiO_2$ composite films shown in Table 1 were formed in the same manner as in Example 2 except that the water-soluble metal compounds shown in Table 1 were used instead of the neodymium nitrate.

TABLE 1

| | Water-soluble metal compound/Amount | Composite film |
|---|---|---|
| Example 4 | $V_2O_5$/0.05 g | $V^{5+}$ doped $TiO_2$ |
| Example 5 | $Mn(NO_3)_2 \cdot xH_2O$/0.09 g | $Mn^{3+}$ doped $TiO_2$ |
| Example 6 | $Ni(NO_3)_2 \cdot xH_2O$/0.06 g | $Ni^{2+}$ doped $TiO_2$ |
| Example 7 | $Cu(NO_3)_2 \cdot xH_2O$/0.05 g | $Cu^{2+}$ doped $TiO_2$ |
| Example 8 | $Ga_2O_3$/2.0 g | $Ga^{3+}$ doped $TiO_2$ |
| Example 9 | $Y(NO_3)_3 \cdot xH_2O$/0.05 g | $Y^{3+}$ doped $TiO_2$ |
| Example 10 | $La(NO_3)_3 \cdot xH_2O$/0.1 g | $La^{3+}$ doped $TiO_2$ |
| Example 11 | $Pr(NO_3)_3 \cdot xH_2O$/0.06 g | $Pr^{3+}$ doped $TiO_2$ |
| Example 12 | $Nd(NO_3)_3 \cdot xH_2O$/0.5 g | $Nd^{3+}$ doped $TiO_2$ |
| Example 13 | $Sm(NO_3)_3 \cdot xH_2O$/0.07 g | $Sm^{3+}$ doped $TiO_2$ |
| Example 14 | $Gd(NO_3)_3 \cdot xH_2O$/0.15 g | $Gd^{3+}$ doped $TiO_2$ |
| Example 15 | $Ho(NO_3)_3 \cdot xH_2O$/0.06 g | $Ho^{3+}$ doped $TiO_2$ |
| Example 16 | $Yb(NO_3)_3 \cdot xH_2O$/0.05 g | $Yb^{3+}$ doped $TiO_2$ |
| Example 17 | $Bi(NO_3)_3 \cdot xH_2O$/0.06 g | $Bi^{3+}$ doped $TiO_2$ |

Quantum efficiencies for these metal-doped $TiO_2$ composite films obtained based on degradation of salad oil are shown in FIG. 1. The quantum efficiencies were calculated as follows.

Number of degraded molecules should be obtained. Molecular weight of the salad oil was determined to be about 315.

The ultraviolet light having a wavelength of 365 nm was irradiated at an illuminance of 1 $mW/cm^2$. Photon number n of the irradiated ultraviolet light is given by dividing incidence energy E by energy of one photon h v. Therefore, the photon number at an illuminance of 1 $mW/cm^2$ is calculated as $1.84 \times 10^{15}$ (photons/$cm^2$/s).

2 mg of salad oil was applied on a film (applied area: 12 $cm^2$), and degraded under the ultraviolet irradiation at the illuminance of 1 $mW/cm^2$. Weight change of the salad oil during the degradation was determined for each sample, and time required for the degradation of the whole oil was measured.

The number of molecules contained in the applied oil is equal to the number obtained by multiplying $6.3 \times 10^{-6}$ moles, which is obtained from the applied amount (2 mg) and the molecular weight (about 315), by the Avogadro's number. Therefore, the number of molecules contained in the applied oil is calculated as $6.3 \times 10^{-6}$ moles $\times 6.0 \times 10^{23} = 3.78 \times 10^{18}$ molecules.

When the time required for the degradation of the oil (2 mg) is assumed to be ten hours ($= 3.6 \times 10^4$ s), and the quantum efficiency is represented by $\Phi$, the following equation can be established:

$$(3.78 \times 10^{18})/(1.84 \times 10^{15} \times 12 \times \Phi) = 3.6 \times 10^4$$

From this equation, $\Phi$ can be calculated as $4.8 \times 10^{-3}$. That is, the quantum efficiency is 0.48% in this case.

Degradation time was measured for each sample, and quantum efficiency for each sample was calculated as the example mentioned above.

The dotted line in FIG. 1 shows a quantum efficiency curve obtained based on oil degradation on a $TiO_2$ film not doped with a metal. From these results, it can be seen that, from the viewpoint of the activity of photocatalyst, a $TiO_2$ composite film doped with Ni, Ga, Y, Pr, Gd, Ho, Yb, or Bi, which showed a quantum efficiency comparable to or higher than that observed in the oil degradation on the $TiO_2$ film, especially a $TiO_2$ composite film doped with Y, Pr, Gd, Ho, Yb, or Bi, which showed a quantum efficiency higher than that observed in the oil degradation on the $TiO_2$ film is preferred.

Example 18

A disc-shaped plastic substrate for spectacle lenses having a diameter of 70 mm and a thickness of 5 mm was prepared. Both sides of this substrate were coated with underlying layers composed of silica ($SiO_2$) by vacuum deposition technique (thickness: 1 $\mu$m).

As a fluorotitanium complex compound, 2.8 g of ammonium hexafluorotitanate, $(NH_4)_2TiF_6$, was dissolved in 400 ml of pure water, and stirred. Separately, 10 g of $TiO_2$ anatase microparticles (Wako Pure Chemical Industries, purity: 98%) was suspended in 100 ml of pure water, and stirred. After the suspension was left stand for 2 to 3 days, 2–3 ml of the obtained supernatant was added to the above aqueous solution of the fluorotitanium complex compound.

The solution prepared as described above was transferred to a 500 ml-volume cylindrical container, quickly added with 10 g of boron oxide, and stirred while maintained at 35–40° C. Then, the above plastic substrate was immersed in the solution for about 4 hours. After the treatment, the substrate was removed from the container, washed, and dried to afford a plastic substrate having a $TiO_2$ film. It was confirmed by X-ray diffraction analysis that the $TiO_2$ film was composed of anatase type $TiO_2$. The $TiO_2$ film was further examined by a spectrophotometer (transparency of the film), pencil hardness measurement hardness of the film), and tally step measurement (film thickness), and it was found that the $TiO_2$ film was transparent, and had a pencil hardness of about 6 and a thickness of about 0.3 $\mu$m Furthermore, when the film was observed by AFM (Atomic Force Microscope), it was observed that the surface of the substrate was densely covered by titanium oxide particles having a particle size of about 20–50 nm.

Example 19

30 mg of $TiO_2$ anatase microparticles were suspended in 400 ml of pure water. To this suspension, 2.8 g of ammonium hexafluorotitanate, $(NH_4)_2TiF_6$ was added and dissolved by stirring. Then, 0.35 g of chromium nitrate [Cr(NO$_3$)$_3$.xH$_2$O] was added and dissolved to form a solution.

Figure 2:
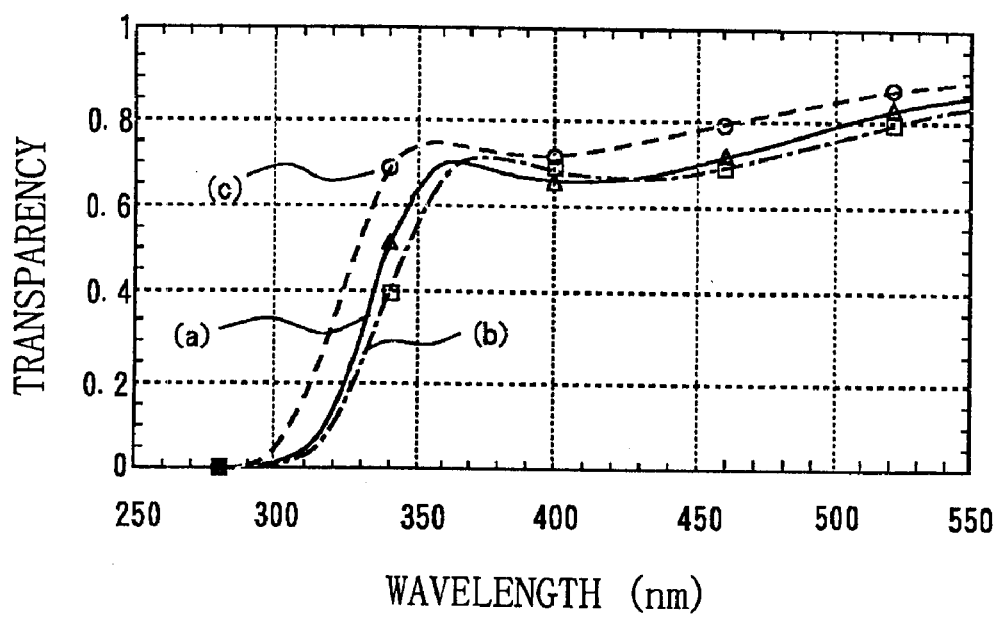
FIG. 2 shows transmission spectra (a) and (b) for the substrates having chromium ion-doped titanium thin film prepared in Examples 19 and 20, respectively, and transmission spectrum (c) for a substrate having titanium thin film.

While maintained at 35–40° C., the solution prepared as described above was added with 10 g of boron oxide and stirred. Then, an alkali-free glass substrate of 50×70×1 mm was immersed in the solution. The substrate was left under the conditions maintained as above for 4.5 hours. At the end of the treatment, the substrate was removed from the solution, washed with water and dried. This substrate was put in an electric furnace, heated by raising the temperature to 500° C., and maintained for one hour to afford a substrate on which a chromium ion-doped titanium oxide thin film of the present invention was formed. The transmission spectrum of this substrate is shown in FIG. 2(a). It can be seen that absorption end of the chromium ion-doped titanium oxide thin film is sifted to the long wavelength region (visible light) side compared with a titanium oxide thin film (c).

The titanium oxide thin film was prepared under the same conditions except that the solution did not contain 0.35 g of chromium nitrate [Cr(NO$_3$)$_3$.xH$_2$O].

Example 20

A chromium ion-doped titanium oxide thin film of the present invention was prepared on a glass substrate in a manner similar to that of Example 19 except that the amount of added chromium nitrate [Cr(NO$_3$)$_3$.xH$_2$O] was 1.0 g, and the immersion of the substrate in the solution was performed by maintaining the solution at 30–40° C. The transmission spectrum of this substrate is shown in FIG. 2(b). It can be seen that absorption end of the chromium ion-dope titanium oxide thin film is sifted to the long wavelength region (visible light) side compared with the titanium oxide thin film (c).

Example 21

Figure 3:
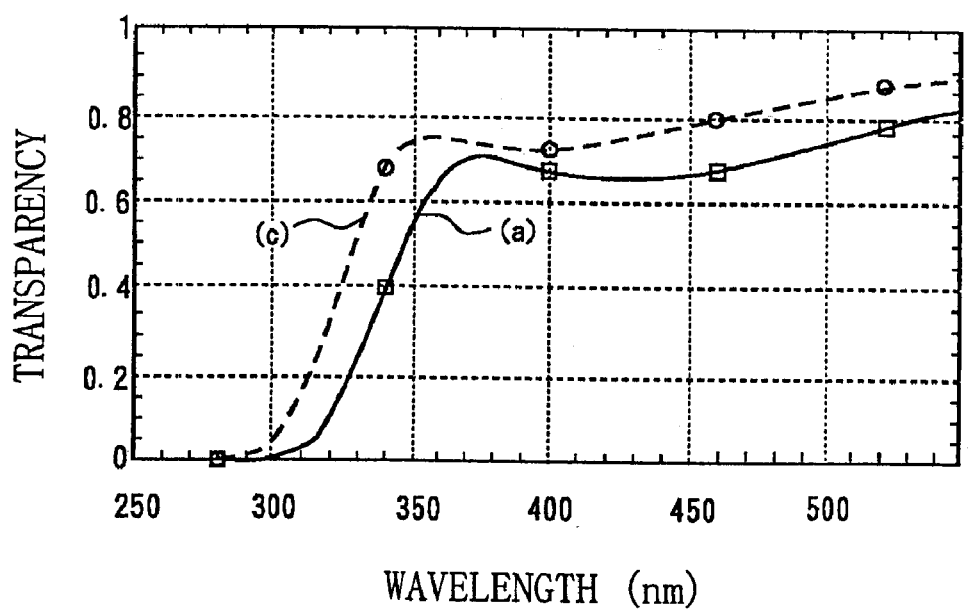
FIG. 3 shows a transmission spectrum (a) for the substrate having chromium ion-doped titanium thin film prepared in Example 21, and transmission spectrum (b) for a substrate having titanium thin film.

An iron ion-doped titanium oxide thin film of the present invention was prepared on a glass substrate in a manner similar to that of Example 20 except that 1.0 g of ferric nitrate [Fe(NO$_3$)$_3$.xH$_2$O] was used instead of the chromium nitrate [Cr(NO$_3$)$_3$.xH$_2$O]. The transmission spectrum of this substrate is shown in FIG. 3(a). It can be seen that absorption end of the iron ion-dope titanium oxide thin film is sifted to the long wavelength region (visible light) side by 25–30 nm compared with the titanium oxide thin film Example 22

Salad oil was applied on the iron ion-doped titanium oxide thin film prepared in Example 21 and the titanium oxide thin film in an amount of 0.1 mg/cm$^2$. Then, they were placed under a black light (10 W), and oil degradation ability was compared from weight loss. As a result, oil was completely degraded on both of the films within 7–10 days. Similar degradation experiment was also performed under an incandescent lamp, which radiated less ultraviolet light, instead of the black light. As a result, substantially no weight loss was observed on the titanium oxide thin film, whereas weight loss of oil at a rate of approximately ⅓ of that observed with the black light was observed on the iron ion-doped titanium oxide thin film.

Comparative Example 1

In 400 ml of pure water, 1 mg of TiO$_2$ anatase microparticles and 1 mg of SiO$_2$ microparticles were suspended. To this suspension, 2.8 g of ammonium hexafluorotitanate, (NH$_4$)$_2$TiF$_6$, and 1.2 g of ammonium hexafluorosilicate, (NH$_4$)$_2$SiF$_6$, were added and dissolved by stirring. Then, 0.15 g of silver fluoride (AgF) was added to the solution and dissolved in it.

The solution prepared as described above was transferred to a 500 ml-volume cylindrical container, and the container was immersed in a water bath maintained at 35–40° C. The solution was quickly added with 15 g of boron oxide and stirred while the temperature of the solution was maintained at 35–40° C. Then, a plastic spectacle lens substrate having a diameter of 70 mm and a thickness of 5 mm, of which surface had been applied with a silica anti-reflection film by vacuum deposition, was immersed in the solution. The substrate was left under the conditions maintained as above for 4 hours.

At the end of the treatment, the substrate was removed from the container, roughly washed, and further washed by an ultrasonic cleaner. Then, the substrate was dried at 40° C. to form a TiO$_2$/Ag/SiO$_2$ titanium oxide coating film of the present invention on the substrate.

The substrate was irradiated by an ultraviolet lamp (black light, 10 W) for 2 days. Thereafter, it was not fogged even when blown with breath. The substrate maintained similar anti-fogging property for about 15 hours after the ultraviolet irradiation.

Example 23

In 400 ml of pure water, 1 mg of TiO$_2$ anatase microparticles and 1 mg of SiO$_2$ microparticles were suspended. To this suspension, 2.8 g of ammonium hexafluorotitanate, (NH$_4$)$_2$TiF$_6$, and 1.5 g of ammonium hexafluorosilicate, (NH$_4$)$_2$SiF$_6$, were added and dissolved by stirring. Then, 0.15 g of silver fluoride (AgF), and then 0.2 g of neodymium nitrate [Nd(NO$_3$)$_3$.xH$_2$O] were added to the solution and dissolved in it.

The solution prepared as described above was transferred to a 500 ml-volume cylindrical container, and the container was immersed in a water bath maintained at 35–40° C. The solution was quickly added with 15 g of boron oxide and stirred while the temperature was maintained at 35–40° C. Then, a plastic spectacle lens substrate having a diameter of 70 mm and a thickness of 5 mm, of which surface had been applied with a silica anti-reflection film by vacuum deposition, was immersed in the solution. The substrate was left under the condition maintained as above for 4 hours.

At the end of the treatment, the substrate was removed from the container, roughly washed, and further washed by an ultrasonic cleaner. Then, the substrate was dried at 40° C. to form a TiO$_2$(Nd:$^{3+}$)/Ag/SiO$_2$ coating film on the substrate.

The obtained substrate was irradiated by an ultraviolet lamp (black light, 10 W) for 2 days. Thereafter, it was not fogged even when blown with breath. The substrate maintained similar anti-fogging property for at least 36 hours after the ultraviolet irradiation. The anti-fogging property was maintained for a period more than 2 times of that observed with the coating film not doped with Nd$^{3+}$.

Further, even after the property was lost, it was recovered by ultraviolet irradiation for about 30 minutes.

According to the methods for producing composites of the present invention, films of a composite comprising a metal oxide in combination with one or more other oxides or metals as a third component, or a composite comprising a metal oxide doped with metal ions as a third component can be prepared without need of a treatment at high temperature. According to the methods of the present invention, a third component can be added to or in combination with a metal oxide to improve functions of the metal oxide, prolong the retention time of the functions and the like. Further, when the metal oxide is titanium oxide, the methods enables to prepare a composite containing platinum or ruthenium oxide as a promoter onto the surface of titanium oxide more densely, and hence improving its function as photocatalyst.

According to the method for precipitating titanium oxide coating layers of the present invention, without requiring a treatment at a high temperature, titanium oxide coating layers having transparency, low peeling property and weather resistance, which are comparable to or even more excellent than those of conventional ones, as well as surface hardness comparable to that of coating films produced by using sintering, can be formed on a plastic substrate. Furthermore, a titanium oxide coating layer can be formed on a plastic substrate having an underlying layer by the methods of the present invention, and the resulting plastic substrate exhibited excellent photocatalytic activity and durability.

According to the method for producing visible light absorbable titanium oxide of the present invention, titanium oxide exhibiting photocatalytic activity even with light of visible light range can be produced by a process much simpler and easier than the ion-implantation technique. The titanium oxide doped with metal ions obtained by the method of the present invention is excellent in absorption of light in visible light range, and is a photocatalyst having more excellent photocatalytic activity compared with titanium oxide.

The anti-fogging material of the present invention can provide a anti-fogging material having transparency, low peeling property and weather resistance, which are comparable to or even more excellent than those of conventional ones, as well as surface hardness comparable to that of coating films produced by using sintering, and having excellent photocatalytic function of titanium oxide and a reflectance lower than titanium oxide without a treatment at a high temperature, and can further provide spectacle lenses and the like having a coating layer composed of the anti-fogging material.

What is claimed is:

1. A method for producing a composite composed of a mixture containing metal oxides derived from metal fluoro complex compounds, which comprises adding a fluoride ion-capturing agent to an aqueous solution containing the metal fluoro complex compounds to precipitate the composite, wherein said aqueous solution is an aqueous solution containing two or more metal fluoro complex compounds, and the composite is precipitated in the presence of two or more seed crystals comprising metal oxides which are the same as those derived from the two or more metal fluoro complex compounds, to form a composite comprising a mixture of two or more metal oxides (these metal oxides are both in a stable phase) derived from the metal fluoro complex compounds.

2. The production method of claim 1, wherein said aqueous solution contains microparticles, and the composite to be formed is a mixture of metal oxides derived from the metal fluoro complex compounds and the microparticles.

3. The production method of claim 1, wherein said aqueous solution contains at least one water-soluble metal compound, and the composite to be formed is a mixture of two or more metal oxides which are derived from the metal fluoro complex compounds and doped with metal ions derived from the water-soluble metal compound.

4. The production method of claim 3, wherein the metal ions are selected from the group consisting of Ni ions, Ga ions, Y ions, Pr ions, Gd ions, Ho ions, Yb ions and Bi ions.

5. The production method of claim 1, wherein the metal of the metal fluoro complex compounds is selected from the group consisting of titanium, silicon, zirconium, niobium, germanium, aluminum, indium, tin, zinc, and copper.

6. The production method of claim 1, wherein the metal of the metal fluoro complex compounds is titanium and/or silicon.

7. A method for producing a composite composed of a mixture containing at least one metal oxide derived from at least one metal fluoro complex compound, which comprises adding a fluoride ion-capturing agent to an aqueous solution containing the metal fluoro complex compound to precipitate the composite, wherein said aqueous solution contains microparticles selected from metal colloidal particles, metal oxide colloidal particles or organic material particles, and the composite to be formed is a mixture of a metal oxide derived from the metal fluoro complex compound and the microparticles.

8. The production method of claim 7, wherein said aqueous solution contains at least one water-soluble metal compound, and the composite to be formed has at least one metal oxide derived from the metal fluoro complex compound and doped with metal ions derived from the water-soluble metal compound.

9. The production method of claim 8, wherein the metal ions are selected from the group consisting of Ni ions, Ga ions, Y ions, Pr ions, Gd ions, Ho ions, Yb ions and Bi ions.

10. The production method of claim 7, wherein said aqueous solution contains at least one seed crystal comprising metal oxide which is the same as that formed from the metal fluoro complex compound.

11. The production method of claim 7, wherein the metal of the metal fluoro complex compound is titanium.

12. A method for producing a composite composed of a mixture containing at least one metal oxide derived from at least one metal fluoro complex compound, which comprises adding a fluoride ion-capturing agent to an aqueous solution containing the metal fluoro complex compound to precipitate the composite, wherein said aqueous solution contains at least one water-soluble metal compound, and the composite to be formed is at least one metal oxide which is derived from the metal fluoro complex compound and doped with metal ions derived from the water-soluble metal compound.

13. The production method of claim 12, wherein the metal ions are selected from the group consisting of Ni ions, Ga ions, Y ions, Pr ions, Gd ions, Ho ions, Yb ions and Bi ions.

14. The production method of claim 12, wherein the metal of the metal fluoro complex compound is titanium.

15. The production method of claim 12, wherein said aqueous solution contains at least one seed crystal comprising metal oxide which is the same as that formed from the metal fluoro complex compound.

* * * * *